US012645817B2

(12) United States Patent
Quibal et al.

(10) Patent No.: US 12,645,817 B2
(45) Date of Patent: Jun. 2, 2026

(54) METHOD AND SYSTEM FOR REDACTING AND RETRIEVING DATA IN A VIDEO

(71) Applicant: Kyocera Document Solutions, Inc., Osaka (JP)

(72) Inventors: Edgar Nielzen Alconis Quibal, Hawthrone, CA (US); Vicente Cheng Gutierrez, South San Francisco, CA (US)

(73) Assignee: Kyocera Document Solutions Inc., Osaka (JP)

( * ) Notice: Subject to any disclaimer, the term of this patent is extended or adjusted under 35 U.S.C. 154(b) by 940 days.

(21) Appl. No.: 17/572,968

(22) Filed: Jan. 11, 2022

(65) Prior Publication Data

US 2023/0222235 A1     Jul. 13, 2023

(51) Int. Cl.
*G06F 21/62* (2013.01)
*G06F 16/735* (2019.01)
*G11B 27/02* (2006.01)

(52) U.S. Cl.
CPC ........ *G06F 21/6218* (2013.01); *G06F 16/735* (2019.01); *G11B 27/02* (2013.01)

(58) Field of Classification Search
CPC .... G06F 21/6218; G06F 16/735; G11B 27/02
See application file for complete search history.

(56) References Cited

U.S. PATENT DOCUMENTS

| | | | |
|---|---|---|---|
| 8,340,498 B1 | 12/2012 | Gill et al. | |
| 10,347,293 B1 * | 7/2019 | Skinner ................. | G06F 3/1462 |
| 2007/0094594 A1 * | 4/2007 | Matichuk .............. | G06F 40/253 |
| | | | 715/255 |
| 2015/0172294 A1 * | 6/2015 | Bittner ................ | G06F 21/6245 |
| | | | 726/4 |
| 2016/0292441 A1 * | 10/2016 | Stuntebeck ......... | G06F 21/6218 |

* cited by examiner

*Primary Examiner* — Matthew T Henning
(74) *Attorney, Agent, or Firm* — Millen, White, Zelano & Branigan P.C.; William F. Nixon

(57) ABSTRACT

A system and method for redacting private or sensitive information in a video file before publishing the video file to the public. The system and method do not redact an original video file but a duplicated video file, and only redacted duplicated video file will be displayed to a public user. Also included is a system and method for retrieving original data corresponding to the redacted data. Metadata is embedded in redacted data of the redacted duplicated video file, which when activated, will direct to a location where the original data is stored.

12 Claims, 6 Drawing Sheets

METHOD AND SYSTEM FOR REDACTING AND RETRIEVING DATA IN A VIDEO

FIELD OF THE INVENTION

The present invention relates to a method and a system for redacting user-defined data of a video file. The present invention is further related to a method and system for retrieving original data of redacted user-defined data in a video file.

DESCRIPTION OF THE RELATED ART

More and more people and business organizations are using social media to post stories and video files and to promote their business. Almost everyone can search and retrieve such information on an internet. In most cases, the posters forget to or did not hide or conceal sensitive or private information that may include texts, pictures of faces and objects, and audio information. Therefore, those sensitive and private information could be used by people with bad intentions or hackers to damage the reputations of the posters. More serious damages may include an identity theft or a blackmail threat to the posters.

In addition to over-exposure in the social media, security cameras located in some public places also capture people's faces, actions, and even the speeches. When a crime occurs, a court may require to submit video files taken by the security cameras. When the video files are playing, it will also expose people's faces, actions, and speeches who are not relative to the crime.

Conventionally, a system operator may manually select and block irrelevant people's faces and their speeches. Such method, however, does not guarantee the total security of the blocked information as the operator simply cover a blur image on the top of the irrelevant information. There are software or technologies that can decode the block information to reveal the original data. Also, the original video files are saved in a database that can be accessible by public users.

Thus, there is still a need for redacting the sensitive information in a way that no public users can decode and retrieve the original sensitive information.

SUMMARY OF THE INVENTION

A method for redacting data in a video file is disclosed. The method comprises creating a duplicate video file of an original video file, receiving user-defined data from a user interface, wherein the user-defined data is generated by a user to define that original data corresponding to the user-defined data in the duplicate video file is required to be redacted, searching the duplicated video file for the user-defined data, and redacting the user-defined data appeared in the duplicated video file by redacting the original data corresponding to the user-defined data. The method further includes extracting the original data from the user-defined data, after redacted, saving the original data to a database that is not accessible by a public user, generating a redacted duplicate video, and saving the redacted duplicate video file in a database, wherein the redacted duplicated video file, instead of the original video file, is to be displayed to the public user upon receiving a search of the original video file from the public user.

The method also includes browsing the duplicate video file to mark a start and an end of at least one video range, searching the at least one marked video range for the user-defined data, and redacting the original data corresponding to the user-defined data in the at least one marked video range.

The method further retrieves the original data of the redacted user-defined data. The method includes selecting the redacted user-defined data, entering a user credential for approval, retrieving the original data of the redacted user-defined data from a database, when approved, and displaying the original data to the user.

A method for retrieving original data from a redacted video file in which the original data corresponding to redacted user-defined data are redacted is further disclosed. The method comprises selecting the redacted user-defined data of the redacted video file. The user-defined data defines that the original data corresponding to the user-defined data is required to be redacted. Also, after being redacted, the original data corresponding to the redacted user-defined data is saved in a separate storage. The method further comprises entering a user credential for approval, identifying the user credential and when approved, retrieving original data corresponding to the redacted user-defined data from the separate storage, and displaying the original data to the user. In the disclosed embodiments, the redacted user-defined data is embedded with a metadata used for linking to a location of the original data corresponding to the redacted user-defined data.

One example of the metadata is a URL link that when activated, will direct to the location of the original data.

A computing device for redacting and retrieving a video file is also disclosed. The computing device comprises a first storage for saving an original video file, wherein the first storage is not accessible to a public user, a processing component for duplicating the original video file to generate a duplicated video file, wherein the original video file is securely saved in the first storage and can only accessed by an authorized user, a user interface for allowing a user to mark at least one time region in the duplicated video file and to enter user-defined data that is required to be redacted, a redaction component for redacting the user-defined data appeared in the duplicate video file to compose a redacted video file with the redacted user-defined data, wherein when redacting the user-defined data, original data corresponding to user-defined data is redacted and extracted, and a display component for displaying the redacted video to the public user in response to a search request of the original video file from the public user.

The processing component saves the original data extracted from the redacted user-defined data in a second storage, and also embeds metadata on the redacted user-defined data that is used for retrieving original data of the redacted user-defined data from the second storage.

According to the disclosed embodiments, the processing component of the computing device further retrieves the original data corresponding to the redacted user-defined data by clicking the redacted user-defined data of the redacted duplicated video file or by pressing a button. When clicking the redacted user-defined data or pressing the button, the user interface displays a login window for a user to enter credential information for authorization.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The preferred embodiments of the present invention provide a security of private personal or sensitive information shown in a video file. More particularly, the present embodiments of the present invention enable a user to custom-defined certain original data in a video or image file to be redacted or encrypted so that when the video or image file is displayed to public, the original data will be replaced by redacted data. On the other hand, the original data that is redacted may be saved in a separate and secured database and cannot be retrieved by unauthorized persons.

The disclosed embodiments of the present invention also relate to a system and method for retrieving original data from redacted user-defined data in a video file or an image file. The disclosed embodiments embed metadata in the redacted user-defined data. The metadata includes a URL link, that when selected, will direct to a location of the saved original data. According to the disclosed embodiments, before opening up the saved original data, it will require an authorizing procedure for checking the legality.

Another important feature of the disclosed embodiments is that the redaction is done in a duplicate video, not in an original video. According to the present invention, the original video is saved in a separate database from the duplicate video and is not accessible by public during a search process.

Figure 1:
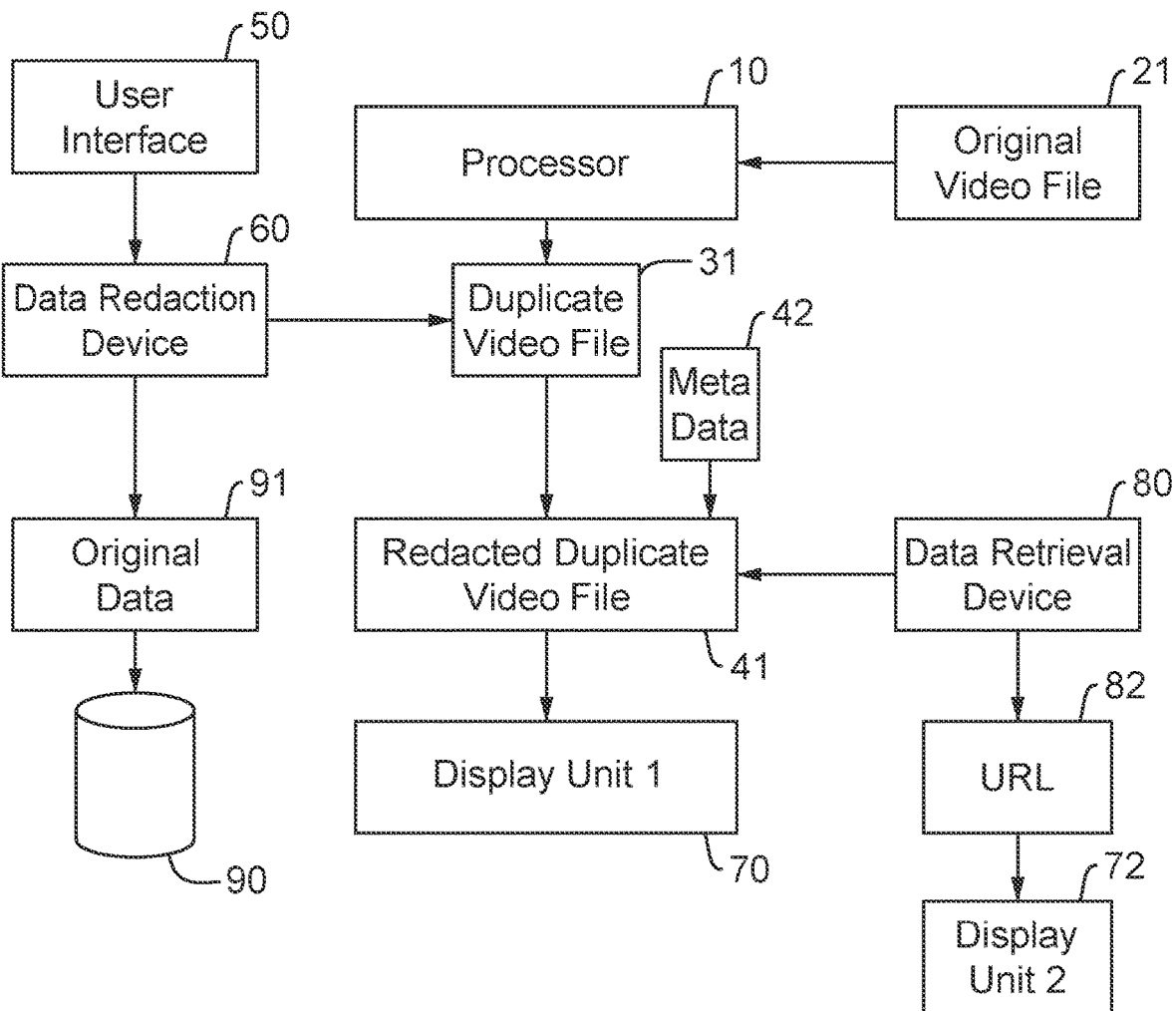
FIG. 1 illustrates a schematic block diagram of a data managing system for redacting user-defined data in a video file and for retrieving original data corresponding to the redacted user-defined data in accordance with the disclosed embodiments.
Figure 2:
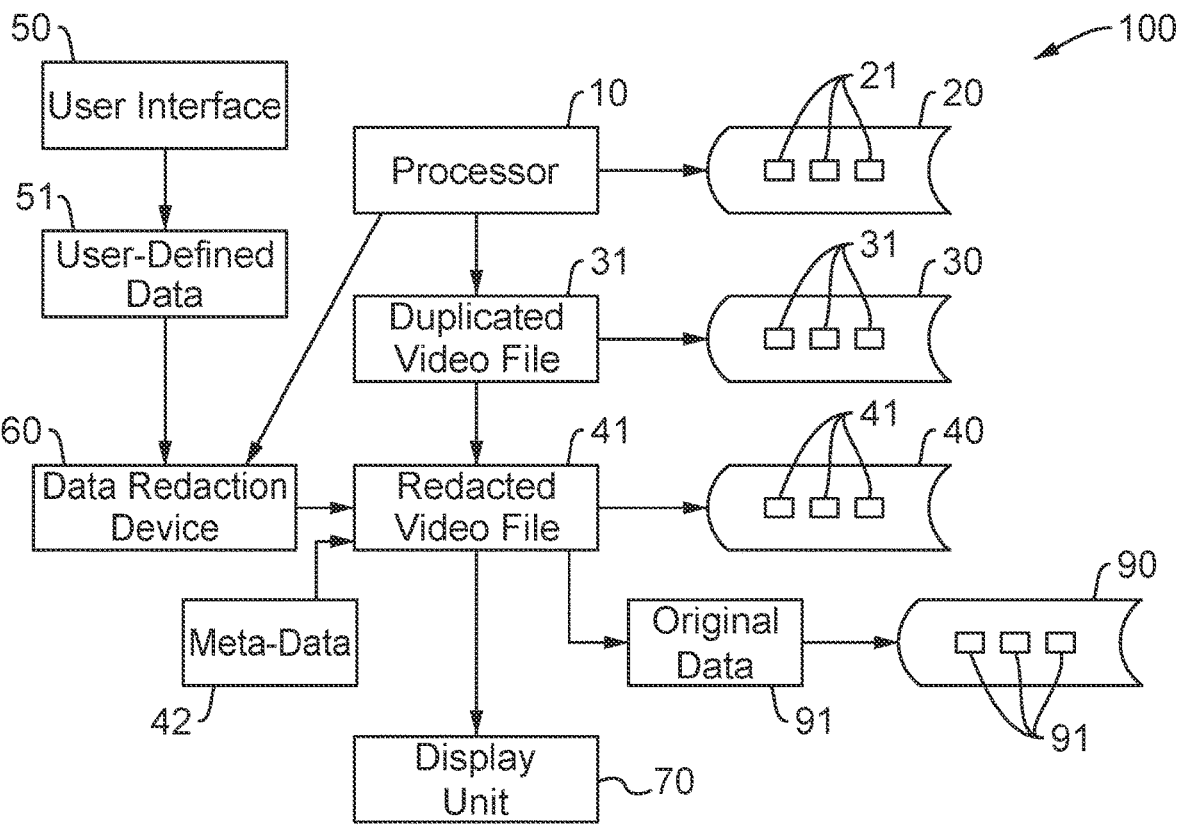
FIG. 2 illustrates a schematic block diagram of a data managing system for redacting user-defined data in a video file in accordance with the disclosed embodiment.
Figure 3:
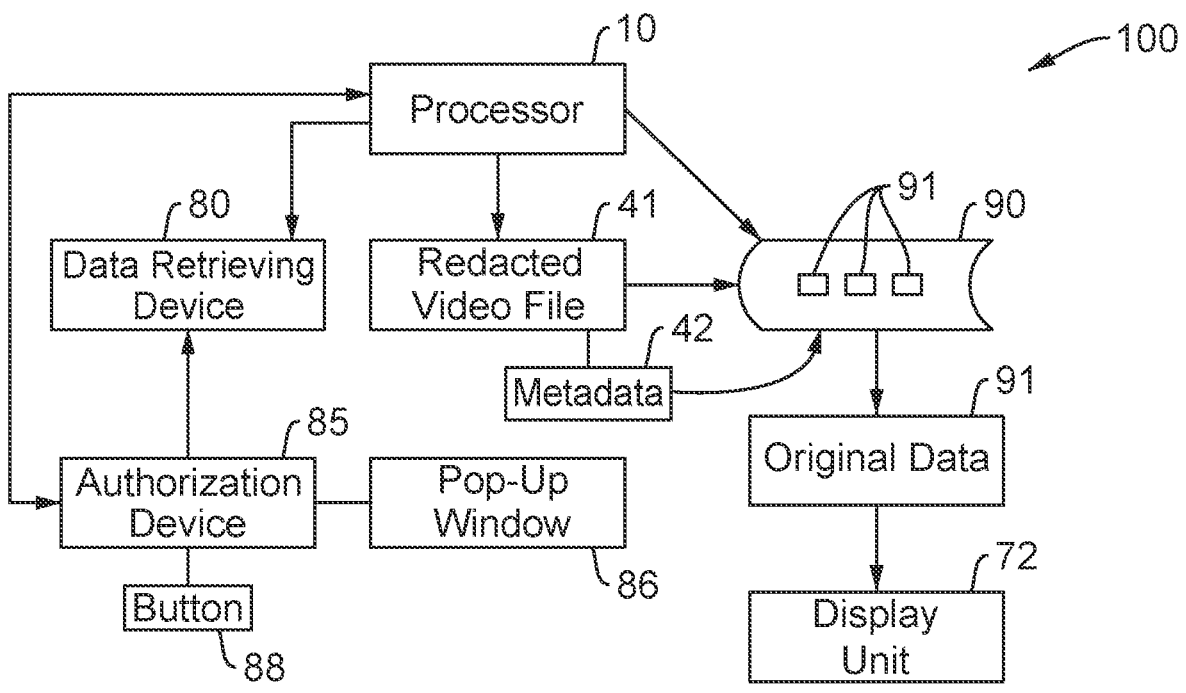
FIG. 3 illustrates a schematic block diagram of a data managing system for retrieving original data of redacted user-defined data in accordance with the disclosed embodiments.

FIG. 1 is a schematic diagram of a data managing system 100 for redacting user-defined data and retrieving original data correspond to the redacted user-defined data in accordance with the disclosed embodiments. FIGS. 2 and 3 are schematic diagrams of data managing system 100 in more details that respectively illustrate redacting user-defined data of a video file and retrieving original data corresponding the redacting user-defined data.

As shown in FIG. 1, data managing system 100 includes processor 10 to duplicate original video file 21 to generate duplicated video file 31 and to control data redaction and retrieval. User interface 50 allows a system operator to select one or more time ranges in the duplicated video file 31 for redaction and to define which original data in the one or more time ranges are to be redacted. The defined original data is also called user-defined data.

Data redaction device 60 is used to redact the user-defined data of duplicated video file 31 upon receiving instructions from processor 10 and to generate a redacted duplicated video file 41. According to the disclosed embodiments, redacted duplicated video file 41 will be stored in database that is searchable and accessible by public users. That is, when a public user searches original video file 21 through a search engine, in the end only redacted duplicated video file 41 will be displayed on the user's display unit 70. Original video file 21 will be stored securely and only authorized personnel can access original video file 21.

In the meanwhile, during the redaction process, data redaction device 60 extracts original data 91 corresponding to the user-defined data and save them to a secured database 90. Data redaction device further embeds metadata 42 in the redacted user-defined data. Metadata 42 is a "data within a data" or a "data describing another data," which allows a user to sort or locate specific documents. In the disclosed embodiments, metadata 42 may be a URL link 82 that once activated, will direct to the location of original data 91. Retrieved original data 91 may be displayed on a display unit 72. Display unit 72 may be a pop-up window. Display unit 72 may also be the same as display unit 70.

Detailed descriptions of data managing system 100 used for redacting user-defined data according to the disclosed embodiments will be illustrated in the block diagram of FIG. 2. In the disclosed embodiments, original video files 21 are stored in first database 20, which does not allow public access. Duplicated video files 31 of original video files 21 are saved in second database 30, which can be accessed and edited by a system operator. According to the disclosed embodiments, some private or sensitive information appeared in the duplicated video files may be processed to be removed, blocked, masked, and so on. The duplicated video files, after redacted, ("redacted video files") may be saved in a third database 40.

The third database 40 is searchable by a search engine. That is, when a public user searches original video files 21 on the search engine, only redacted video files 41 will be displayed on the user's display unit 70 in which sensitive information have been already redacted to protect private or sensitive information. The private or sensitive information may include texts, images, audio, and so on. In some embodiments, third database 40 may be part of second database 30. In other embodiments, there is no need to store duplicated video files. Only redacted video files are stored in a database that is accessible by a search engine.

Data managing system 100 includes processor 10 for generating duplicated video files 31 of original video files 21. Original video files 21 are stored in a secured database 20 that is only accessible by authorized personnel, such as an authorized system operator. According to the disclosed embodiments, original video files 21 are not accessible by public so that the authenticity of original video files 21 can be guaranteed. System 100 does not redact original video files 21 but duplicated video files 31. After redacting duplicated video files 31, system 100 generates redacted video files 41 and saves redacted video files 41 in database 40. In the disclosed embodiments, database 20 and 30 are private database that are not opened to the public so that the private and sensitive information appeared in original video files 21 and their duplicated video files 31 can be protected. Database 40 storing redacted video files 41, however, can be accessible by public during a search process. Therefore, when a public user searches a video file, such as file 21, the public user will not be able to retrieve the original video file. Only redacted video files 41 will be retrieved and displayed on a display unit, such as display unit 70, of the public user.

Data redaction device 60 is used to redact duplicated video files 31. The redaction is executed based on user-defined data 51 entered from user interface 50. A system operator or manager usually decides which data need to be redacted. To be clear, the system operator may manually browse a duplicated video file 31 and marks a time frame/range by marking a start time and an end time. As an example, the marked time range could be between 2-minute mark to 12-minute mark, that makes a total of 10 minutes of redacted video. The system operator also enters information about data within the time range that need redacted. These data are referred as user-defined data 51. During the redaction process, original data corresponding to the user-defined data will be redacted.

According to the disclosed embodiments, user-defined data 51 may include texts, images, and/or audios. The texts include texts in tabular form and transcribed caption. The images may include faces or objects. The audios may include specific spoken words, phrases, and/or sentences. Furthermore, user-defined data 51 may be generated using video OCR (Optical Character Recognition) software, video redaction software or audio redaction software. Redacting the user-defined data 51 may include masking or blurring the texts and images, and/or silencing or covering up audios. The latter may be executed by using an audio redaction software or technology.

Further, the user-defined data are private or sensitive information that is preferably not shown to the public. For example, in a video taken by a security camera, the faces of some irrelevant people may be redacted to protect the people's identity. Certain objects that might not be appropriate or suitable for public display or for some special reasons may also be redacted. For a video presentation, some data in the video may reveal financial information of a person or a company and sensitive data, such as the company or the person's assets or intellectual property data. Such data can also be redacted. Another example is silencing or masking certain voices, speeches, or sounds. The above is for exemplary purposes only and not limited in the disclosed embodiments.

Moreover, in some embodiments, it is not necessary to mark the time range to be redacted in duplicated video file 31. In this case, data redaction device 60 searches user-defined data 51 appeared in the entire duplicated video file 31 and redacts the original data corresponding to user-defined data 51.

After the user-defined data and/or the time range are specified through user interface 50, processor 10 instructs data redaction device 60 to begin redacting the original data corresponding to the user-defined data in duplicated video file 31. Data redaction device 60 searches user-defined data 51 appeared in the marked time range or the entire duplicated video file 31, and redacts original data (including texts, images, and audios) that are corresponding to user-defined data 51. After redaction, a redacted video file 41 is generated. Redacted video file 41 may be saved in database 40 that is searchable and accessible by the public. According to the disclosed embodiments, when a public user searches an original video file 21, only redacted video file 41 generated from duplicated video file 31 will be displayed on display unit 70

In alternative embodiments, during the redaction process, data redaction device 60 not only redacts user-defined data 51, but also extracts original data 91 that corresponds to user-defined data 51 from redacted video file 41 and saves original data 91 in database 90. Original data 91 is safely saved in database 90 and can only be retrieved by authorized persons. Further, during the redaction process, system 100 embeds metadata 42 in redacted user-defined data 51. Metadata 42 is used to link to the location of original data 91.

FIG. 3 is a block diagram of data managing system 100 for retrieving original data 91 from redacted video file 41 according to the disclosed embodiments. As described above, metadata 42 embedded in the redacted user-defined data of redacted video file 41 allows an authorized person to link to the location of original data 91. Metadata 42 may be a URL link directing to the location of original data 91 in database 90. Moreover, only authorized personnel can retrieve original data 91.

Therefore, data managing system 100 includes an authorization device 85 for checking identities of a user who requests a data-retrieval from data retrieving device 80. When the user activates the retrieval of original data, he/she may click or double-click a redacted user-defined data appeared in redacted video file 41. The user may also activate the retrieval request by pressing a button 88 or clicking a key or a combination of codes of a keyboard (not shown). After receiving the data retrieval request, authorization device 85 may activate a pop-up window 86 or a request that prompts the user to enter his/her identification information. Once the identity of the user is checked and approved, metadata 42 that is embedded in the redacted user-defined data will direct to the location of original data 91 that corresponding to the selected redacted user-defined data, and original data 91 will be displayed on display unit 72. Display unit 72 may be a regular display unit of a computing device or a pop-up window. As only authorized persons can view the original data, system 100 in accordance with the disclosed embodiments can effectively protect the privacy of sensitive information in duplicated video file 41.

Figure 4:
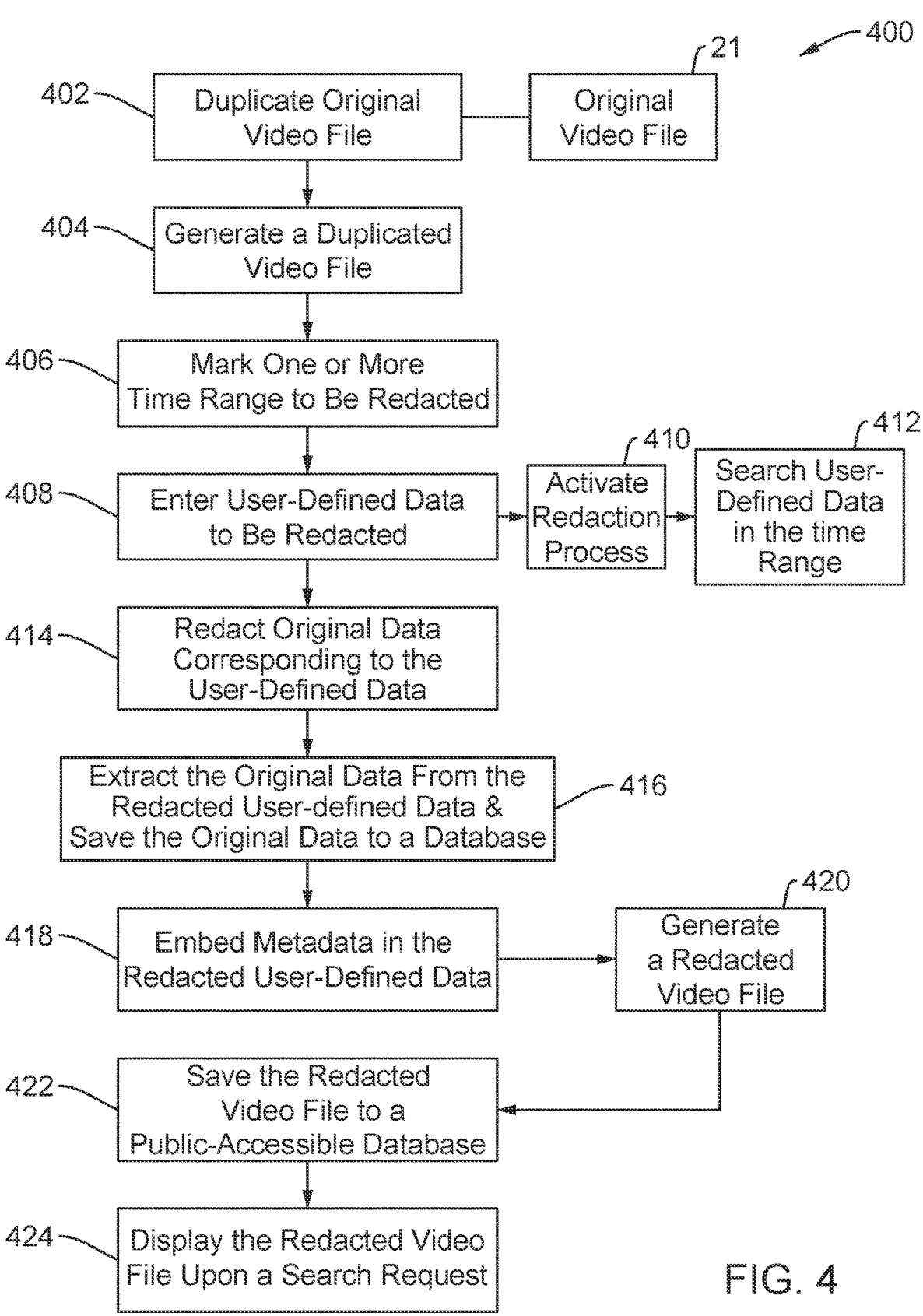
FIG. 4 illustrates a flow diagram for redacting user-defined data in a video file in accordance with the disclosed embodiments.

FIG. 4 illustrates a flowchart 400 for redacting user-defined data of a video file according to the disclosed embodiments. The disclosed embodiments do not redact original video file 21 but a duplicate video file of original video file. Therefore, step 402 executes by duplicating original video file 21 that is stored in a secured database, such as database 20 of FIG. 2. A duplicated video file is generated at step 404.

Next, flowchart 400 sets up conditions for redacting certain data appeared in the duplicated video file. Step 406 executes by marking a start and an end of a time range that is concerned and needs redacted. There may be more than one time range to be redacted. According to the disclosed embodiments, marking the time range may be done by manually browsing the duplicated video by a system operator or by automatically searching criteria specified by the system operator. Next, step 408 executes by entering user-defined data that is required to be redacted. The user-defined data may be entered by the system operator through a user interface, such as user interface 50 of FIG. 2. The user-defined data may include at least one of texts, images of faces or objects, audio of sentences or part audio of speeches.

Step 410 executes by activating the redaction process. After that, step 412 executes by searching user-defined data in the one or more time ranges of the duplicated video file. Step 414 then executes by redacting original data corresponding to the user-defined data of the duplicated video file. For example, when the user-defined data are texts, step 414 executes by searching texts and redacting the text from the part of the video wherein the text is shown. It is noted that the text to be redacted may also include transcribed caption. When the user-defined data is a face or an object, step 414 may execute by using a video OCR/video redaction software to blur or block the face or object shown in the duplicated video file. As to when the user-defined data are audio, step 414 may execute by using audio redaction software to redact specific audio shown in the duplicated video file. The user-defined data may be a combination of texts, images, and audio. In this case, step 414 may execute by applying suitable software to redact data. Although the above exemplary embodiments use above-identified software or technologies to redact the user-defined data, the disclosed embodiments do not limit to these software and technologies and other software or technologies may also be used for the purpose of redaction.

During the redaction process, step 416 executes by extracting the original data from the redacted user-defined data and saving the original data to a database. This database may be database 90 of FIG. 2 that can only be accessed by an authorized person so that the original data can be saved securely. Further, step 418 executes by embedding metadata in the redacted user-defined data of the duplicated video file. As mentioned above, the metadata allows a user to locate the original data during a data-retrieval process, which will be described in more detail with reference to FIG. 6. In FIG. 4, after the redaction process is completed, a redacted video file is generated at step 420, and step 422 executes by storing the redacted video file to a database, such as database 40 of FIG. 2. As described above, database 40 is open to and accessible by public users through a search engine. Therefore, even if a public user searches for original video file 21, only its related redacted video file will be displayed to the public user, as shown at step 424. Original video file 21 will be saved securely in database 20 and will not be sent to the public user.

In flowchart 400, the system operator marks one or more time range to be redacted at step 406. However, such a step may be omitted if the duplicated video file is not too large in size. This alternative embodiment will be described in a flowchart 500 shown in FIG. 5. Flowchart 500 is similar to flowchart 400 except that some steps are omitted.

Figure 5:
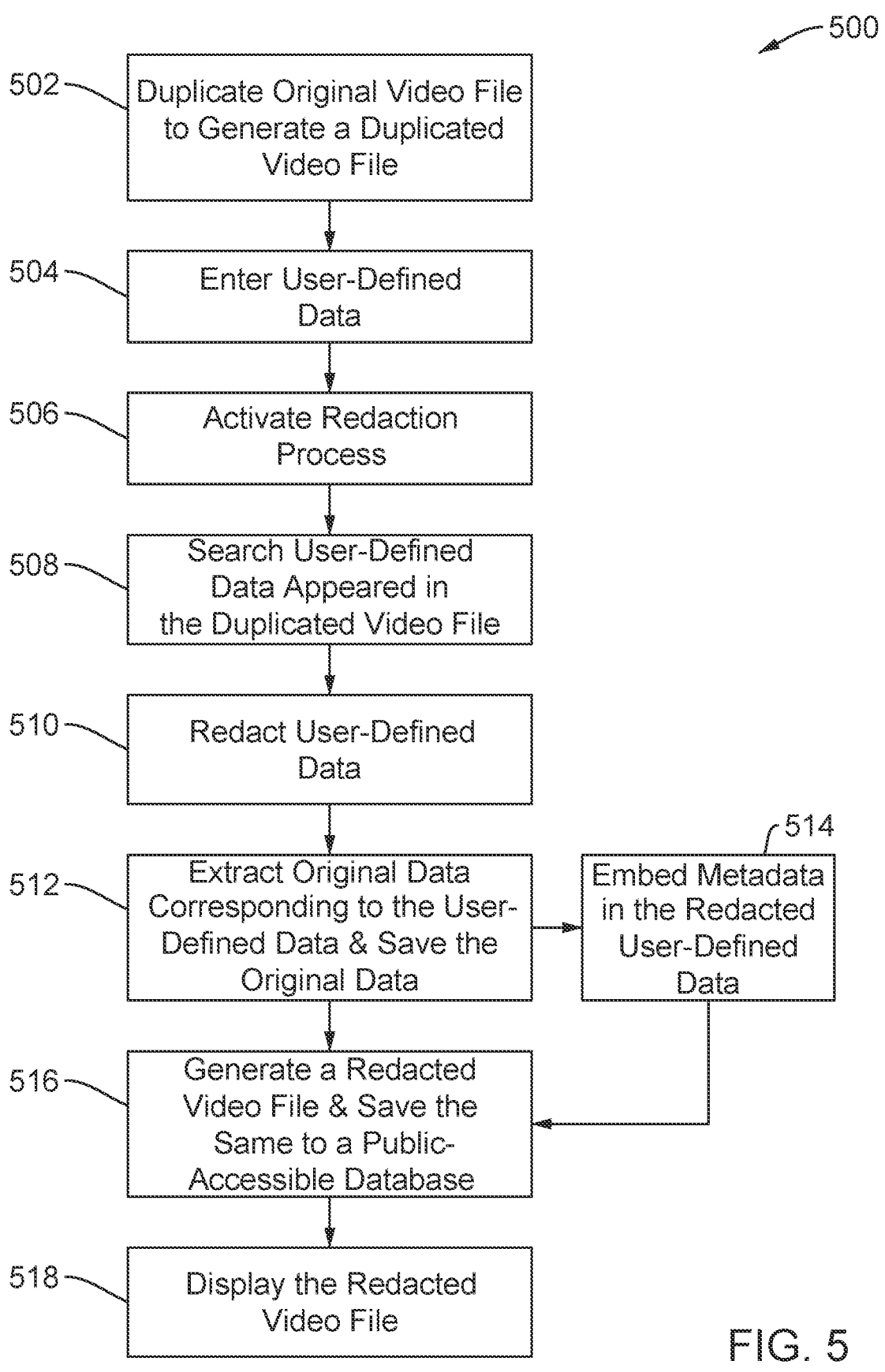
FIG. 5 illustrates an alternative flow diagram for redacting user-defined data in a video file in accordance with the disclosed embodiments.

In FIG. 5, step 502 executes by duplicating an original video file to generate a duplicated video file. Step 504 executes by entering user-defined data. After the user-defined data is entered, step 506 executes by activating the redaction process.

Next, step 508 executes by searching the entire duplicated video file for the user-defined data and step 510 executes by redacting the user-defined data of the duplicated video file. In the meantime, step 512 executes by extracting original data from the redacted user-defined data and saving the original data to a secured database not accessible by public users. In the meantime, step 514 executes by embedding metadata in the redacted user-defined data of the duplicated video file. Next, a redacted video file is generated and saved to a public-accessible database, as shown at step 516. Same as step 424, when the public user searches the original video file using the search engine, only the redacted video file related to the original video file will be displayed to the public user, as shown at step 518.

In accordance with the disclosed embodiments, the original data is saved in a secured database and only authorized users are able to retrieve the original data. Therefore, when it is necessary to retrieve the original data that are redacted, it requires to perform an authorization process to check the credential of a person who requests the retrieval of the original data.

Figure 6:
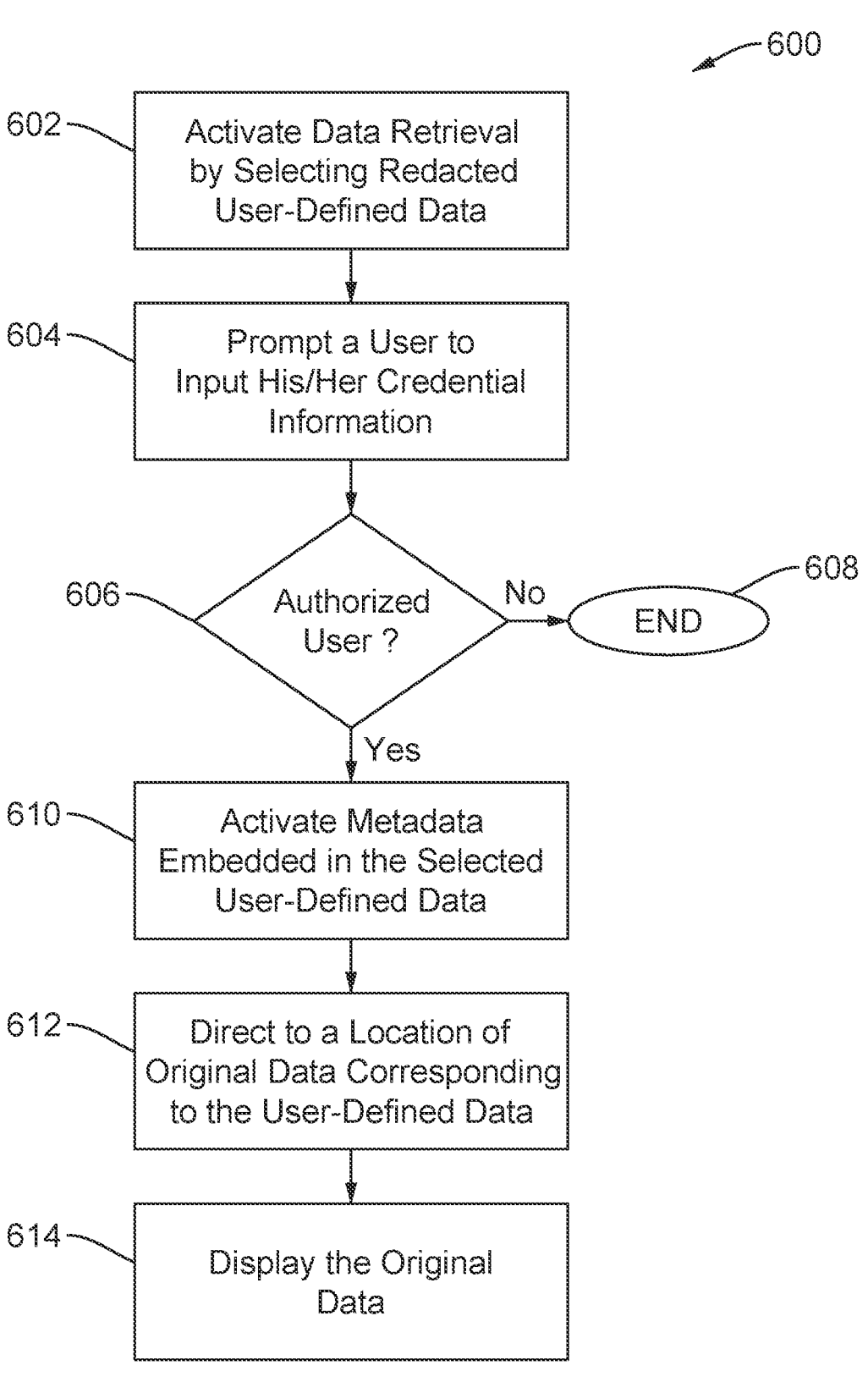
FIG. 6 illustrates a flow diagram for retrieving original data from a redacted user-defined data in a video file in accordance with the disclosed embodiments.

FIG. 6 is a flowchart 600 for retrieving original data from a redacted video file according to the disclosed embodiments. At step 602, a data retrieval process is activated. Activating the data retrieval process may involve a user clicking or double-clicking a redacted user-defined data of the redacted video file or pressing a button. However, the activation methods are not limited to herein, other method for activating the retrieval process can also be used without limitations.

After the data retrieval process is initiated, step 604 executes by prompting the user to enter his/her credential information. In this step, a pop-up window may appear on a screen that allows the user to enter his/her credential information. However, the method for entering the user's credential information is not only limited to the pop-up window. Other manners that allow the user to enter the credential information may also be applied to the disclosed embodiments.

Step 606 executes by determining if the user is an authorized person by checking his/her credential information. If the answer is No, then user is not allowed to retrieve the original data and the process ends at step 608. However, if the answer is Yes, the user is an authorized user, and step 610 executes by activating the metadata that is embedded in the selected redacted user-define data. Therefore, at step 612, the metadata generates a URL link that directs to a location of original data corresponding to the selected redacted user-defined data. Next, step 614 executes by displaying the original data to the authorized user.

As mentioned above, the original data may be either one of a text, a picture of a face or an object, and an audio file, or a combination of the three. Thus, at step 614, the retrieved original data will be displayed to the authorized user in a form of the text, a picture of the face or the object, or the audio file.

According to the disclosed embodiments, the authorizing process may be executed only once. That is, the user will be required to enter his/her credential information only one during the entire retrieval process. However, the user may be required to enter his/her credential information for each redacted user-define data he/she requests.

The system and method of the disclosed embodiments redact private or sensitive information appeared in a video file before publishing the video file to the public. To fully protect the sensitive information, the disclosed embodiments do not redact original video files. Instead, the disclosed embodiments duplicate the original video and save the original video file in a secured database that cannot be accessed by the public users. The redaction of data is executed on the duplicated video file. Most importantly, when a public user searches the original video file by using a search engine, only the duplicated video file, after redacted, will be displayed to the public user. The original video file will be intact and untouched during the search process.

Further, the system and method of the disclosed embodiments extracts original data that is corresponding to the redacted data from the redacted video file and save them into a public-inaccessible database. The disclosed embodiments also embed a metadata in the redacted data so that an authorized user may retrieve the original data through the embedded metadata. One example of the metadata is a URL link, which when activated, can direct to a location where the original data is stored.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computing system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more content management systems coupled to a network capable of exchanging information and data. Various functions and components of the content management system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for redacting data in a video file, the method comprising:

creating a duplicate video file of an original video file, wherein the original video file is saved in a first database not accessible by a public user;

receiving user-defined data from a user interface, wherein the user-defined data is generated by a user and defines at least one portion of the duplicate video file to be redacted in the duplicate video file;

extracting the at least one portion of the duplicate video file defined by the user-defined data from the duplicate video file;

saving the extracted at least one portion of the duplicate video file defined by the user-defined data to a second database as redacted user-defined data, wherein the second database is not accessible by the public user;

embedding metadata in the redacted user-defined data, wherein the metadata indicates a location of the redacted user-defined data and is used to retrieve and display the redacted user defined data;

generating a redacted duplicate video file, wherein the redacted duplicate video file excludes the at least one portion of the duplicate video file defined by the user-defined data; and saving the redacted duplicate video file in a third database, wherein the third database is accessible by the public user during a search process, and wherein the redacted duplicate video file, instead of the original video file, is to be displayed to the public user upon receiving a search of the original video file from the public user.

2. The method of claim 1, further comprising browsing the duplicate video file to mark a start and an end of at least one video range, searching the at least one marked video range for the user-defined data, and redacting the user-defined data in the at least one marked video range.

3. The method of claim 1, wherein the user-defined data includes texts, images, and audio data.

4. The method of claim 1, wherein the redacting of the user-defined data is executed by using at least one of a video OCR (Optical Character Recognition), a Video Redaction software, and an audio redaction software.

5. The method of claim 1, further comprising retrieving the at least one portion of the duplicate video file defined by the user-defined data, wherein the retrieving the at least one portion of the duplicate video file defined by the user-defined data comprises:

selecting the at least one portion of the duplicate video file defined by the user-defined data, entering a user credential for approval;

when approved, retrieving the at least one portion of the duplicate video file defined by the user-defined data from the second database; and displaying the at least one portion of the duplicate video file defined by the user-defined data to the user.

6. The method of claim 5, wherein contents of the at least one portion of the duplicate video file defined by the user-defined data is displayed on a separate pop-up window.

7. The method of claim 1, wherein the metadata is a URL link, which when activated, directs to a location where the at least one portion of the duplicate video file defined by the user-defined data is saved.

8. A method comprising:

selecting redacted user-defined data, wherein the redacted user-defined data defines at least one portion of a video file that has been duplicated from an original video file, redacted from the duplicated video file, and saved in a first storage as a redacted duplicated video file, and wherein the redacted duplicated video file is saved in a second storage;

entering a user credential for approval;

identifying the user credential and when approved, retrieving the at least one portion of a video file that has been duplicated from the original video file, redacted from the duplicated video file, and saved in the first storage; and displaying the defines at least one portion of a video file that has been duplicated from the original video file, redacted from the duplicated video file, and saved in the first storage to the user, and wherein the redacted user-defined data is embedded with a metadata which links the redacted user-defined data to the at least one portion of a video file that has been duplicated from the original video file, redacted from the duplicated video file, and saved in the first storage.

9. The method of claim 8, wherein the metadata includes a URL link corresponding to the at least one portion of a video file that has been duplicated from the original video file, redacted from the duplicated video file, and saved in the first storage.

10. The method of claim 8, wherein the at least one portion of a video file that has been duplicated from the original video file, redacted from the duplicated video file, and saved in the first storage is displayed on a pop-up window.

11. The method of claim 8, further comprising initiating a login window, after selecting the redacted user-defined data, for entering the user credential.

12. The method of claim 8, wherein the at least one portion of a video file that has been duplicated from the original video file, redacted from the duplicated video file, and saved in the first storage includes texts, images, and audio data.

* * * * *